Fig.2.

Dec. 2, 1924.  1,517,977
R. E. GIBSON ET AL
APPARATUS FOR CHARGING FURNACES OF GAS RETORTS AND THE LIKE
Filed Aug. 2, 1923  7 Sheets-Sheet 5

Inventors
Ralph Ernest Gibson
Herbert Nicoll,
By
Associate Attorneys.

Dec. 2, 1924.  
R. E. GIBSON ET AL  
1,517,977  
APPARATUS FOR CHARGING FURNACES OF GAS RETORTS AND THE LIKE  
Filed Aug. 2, 1923  
7 Sheets-Sheet 7

Inventors  
Ralph Ernest Gibson  
Herbert Nicoll,  
By  
Associate Attorneys

Patented Dec. 2, 1924.

1,517,977

UNITED STATES PATENT OFFICE.

RALPH E. GIBSON AND HERBERT NICOLL, OF LIVERPOOL, ENGLAND.

APPARATUS FOR CHARGING FURNACES OF GAS RETORTS AND THE LIKE.

Application filed August 2, 1923. Serial No. 655,380.

*To all whom it may concern:*

Be it known that we, RALPH ERNEST GIBSON and HERBERT NICOLL, both subjects of the King of Great Britain, both residing in Liverpool, in the county of Lancaster and Kingdom of England, have invented certain new and useful Improvements in Apparatus for Charging Furnaces of Gas Retorts and the like, of which the following is a specification.

This invention relates to apparatus for handling incandescent coke discharged from gas-retorts, coke-ovens or the like by discharging machines, and refers to apparatus of the type in which the coke is received on its discharge into a tube or chute mounted on a travelling carriage that runs on the discharging stage of the retort-house, the said tube or chute having hoisting-means whereby either of its ends may be raised or lowered, so that the coke may be discharged by gravity from either end according to requirements.

The invention comprises improvements in our patented machine (United States Patent No. 1,424,010) for handling red-hot coke, in which machine the coke-receiving tube is hinged at its back end, and has its front or receiving end raised by electric or other hoisting-machines to any required angle to connect, by means of curved tubular bridge-pieces, with the upper tiers of retorts. The coke pushed out of the retorts passes into the said tube, and is discharged by gravity from the back end of the tube on to a quenching-table or other cooling apparatus fixed outside the retort-house, or to outside producers, or when it is required to feed the coke into internal producers, the tube after receiving its charge of coke is brought to the horizontal position, and the back end of the tube is raised by additional hoisting means, the coke in the tube being then discharged by gravity over the front end of the tube into the internal producer.

This system of feeding internal producers results in a great saving of labour, as it avoids the arduous manual labour involved in charging such producers by hand, as has been done heretofore, and also avoids the practice of partially quenching the incandescent coke to enable the men to approach it, thus giving greater efficiency in the producers due to the conservation of heat.

It has been found in practice, however, that the unaided gravity-feed of internal producers in the manner described does not enable the producer furnace to be charged in such a manner as to give a fuel bed of the proper depth in the rear part of the furnace, owing to the limitations imposed by the relative position of the producer and its feeding door.

One of the principal objects of the present invention is to remedy this, and to provide mechanical means for applying pressure to the back of the charge of coke, and so supplementing the gravity-discharge.

A further feature of our improvements lies in the construction and operation of the coke-receiving tube (hereinafter, for brevity, usually termed "coke-tube"), whereby we are enabled to dispense with the curved tubular bridge-pieces mounted on the framework of the travelling carriage of the machine as described in our Patent No. 1,424,010. It has been found in practice that when the front end of the coke-tube is moved away from the bridge-pieces to discharge the coke by gravity, the portion of the red-hot coke which was contained in the bridge-pieces falls to the ground. Accordingly, instead of using such fixed bridge-pieces, we may arrange that the coke-tube be built telescopically, so as to be adjustable in length to suit the various heights of the tiers of retorts; or alternatively instead of the tube having a radial movement about a point which is fixed in relation to the tube, resulting in a gap between its front end and the upper tiers of retorts which requires to be bridged, we may make the point about which the tube is hinged a movable one so that the front or receiving end of the coke-tube can be brought to within the same distance of each tier of retort mouthpieces, thus doing away with the necessity for bridge-pieces. The gap in this case formed between the back end of the tube and the hinged apron plate, would be bridged over by a chute-plate or other suitable means.

In another construction, we may use two coke-tubes mounted in parallel on the carriage. One of these tubes receives coke discharged from lower tiers of retorts. The other tube is made in two portions, namely a fixed rear portion set in an inclined position, and a front radially movable portion hinged to the front end of the fixed inclined tube portion. The movable hinged part of the tube is adapted to receive coke from the upper tiers of retorts, and to pass it into the fixed tube, the hinged portion being hoisted to connect with the retorts.

The invention will be further described with reference to the accompanying drawings, in which:—

Figure 1:
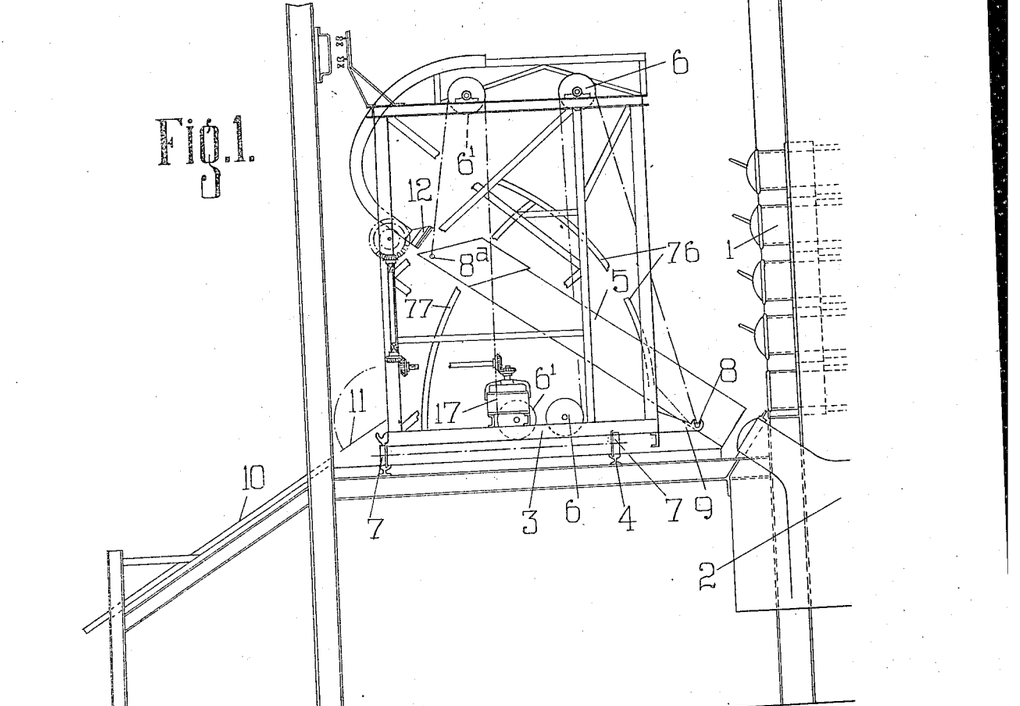
Figure 1 is a section through the discharging stage of a retort-house, showing our improved machine in side elevation adapted to work in conjunction with five tiers of retorts, and with the coke-tube in position for feeding an internal producer.

In Fig. 1, 1 denotes the retorts, arranged in five tiers, 2 one of the internal producers under the bench of retorts, 3 is the travelling carriage of the machine that runs in front of the retorts on rails 4 laid on the floor of the discharging stage of the retort-house. 5 is the coke-tube, the front and back ends of which can be raised or lowered by hoisting gear 6, 6', driven by electric motors, one of which also drives the travelling wheels 7 of the carriage.

Figure 1 shows the back end of the coke-tube 5 raised to enable coke to be discharged from the front end of the tube into the internal producer 2.

When the tube is in its bottom horizontal position, trunnions 8 and 8ª on the front and back ends of the cradle to which trunnions the hoisting-gear is connected, rest in bearings 9 on which the cradle pivots when tilted at either end by the hoisting-gear.

10 is the inclined quenching-table outside the retort-house and 11 a hinged apron-plate that can be operated from the driver's platform, over which apron-plate the coke passes when the front end of the coke-tube is raised to discharge coke through a doorway or opening in the wall of the retort-house on to the quenching-table 10.

The general construction of the travelling carriage is similar to that described in our prior patent aforesaid, and need not be here further described.

Figure 2:
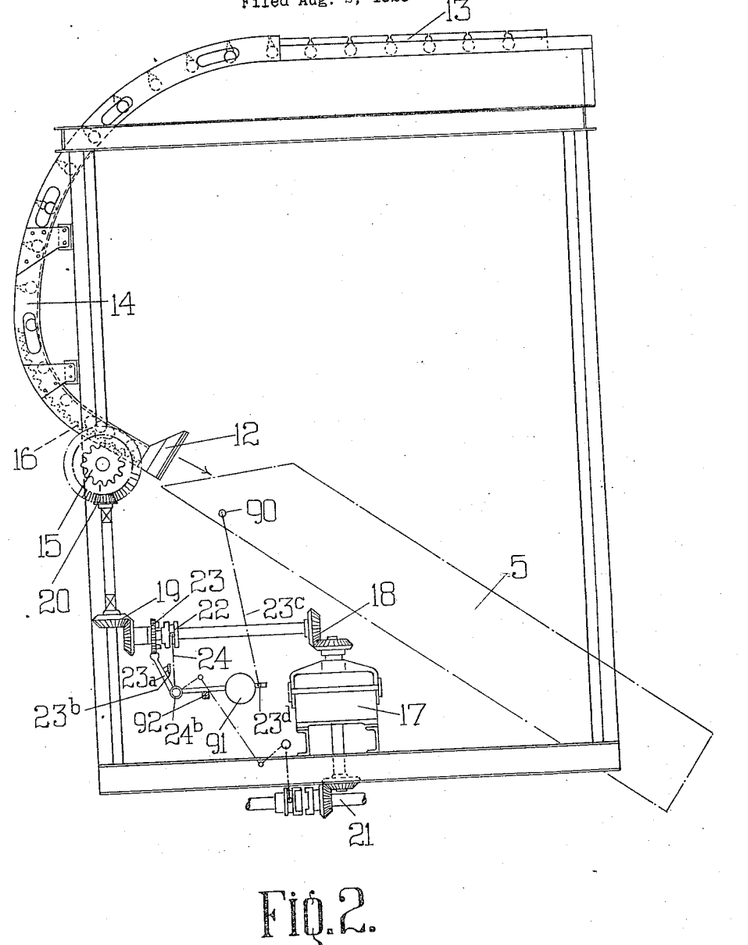
Figure 2 is a side elevation of the coke-tube ram or pusher and its operating mechanism on a larger scale.

As shown in Figs. 1 and 2 of the annexed drawings, we provide a ram or pusher, which, when the back end of the tube is raised to the inclined position necessary to discharge coke into the internal producer, is caused to enter the back end of the tube, and apply pressure behind the mass of coke therein, so as to force the coke into the producer in a body. 12 is the ram or pusher-plate, operated by a block or like chain 13 driven by sprocket-gear. In the construction shown, the pusher-plate 12 is connected to one end of the block-chain 13 which is guided at each side in suitable channel guides 14, and driven by a sprocket-gear 15 engaging corresponding teeth 16 on the chain-links and operated, when required, by the electric motor that works the hoisting-gear for the back end of the tube, or by a separate motor, if desired, or as shown in the drawings, from the motor driving the travelling gear. The sprocket-wheels which are situated in any suitable position on the upper part of the framework of the travelling carriage, are preferably situated as near as may be convenient to the back end of the tube when it is tilted to its inclined position for discharging its contents into the producer 2. 17 is a gear-box and 18, 19 and 20 bevel-gears and shafting for driving the sprocket-gear 15 that drives the chain 13. 21 is the driving-shaft of the travelling wheels 7, and 22 is a clutch that controls the operation of the sprocket-gear 15.

We may combine the controlling means for the ram or pusher with the controller of the electric hoist for raising and lowering the back end of the coke-tube, in such a way that the ram or pusher can only be actuated when the tube reaches the discharge position in relation to the mouth of the internal producer. This may be effected by means of a clutch or control arrangement and trip-gear. When the tube is brought into the discharge position a masking lever 23ᵇ, which is a projection from the pawl lever 23ª rotatably mounted on the shaft 24ᵇ, is raised out of contact with the clutch lever 24 by means of a flexible connection 23ᶜ from the coke-tube at 90, to a crank arm 23ᵈ of the pawl lever 23ᵃ; thereby the clutch is free to engage and cause the ram or pusher to enter the back end of the coke-tube. A reverse movement of the controller causes the ram or pusher to be withdrawn just clear of the tube, and the back end of the tube is then lowered to its original position whereupon the lever or pawl 23ᵃ engages the ratchet teeth 23 on the clutch mechanism, and also the masking lever 23ᵇ is brought into the operative position owing to the crank lever 23ᵈ coming against a stop 92 as shown in full lines in the drawings by means of the weight 91. The action of the pawl lever 23ᵃ is to prevent the ram descending by gravity alone.

Heretofore the lining of the tube has been effected by fire clay slabs bolted to a metal casing, but this mode of lining would not be suitable for use with the proposed ram arrangement.

Figure 4:
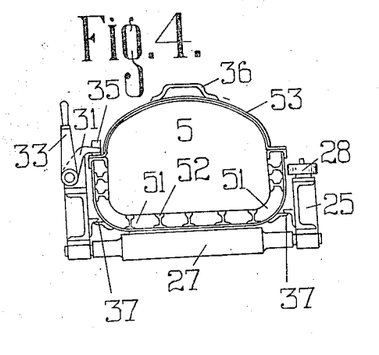

Accordingly we provide an improved arrangement for lining the tubes with non-conducting coverings or insulations held between rails located longway of the tube which at the same time forms runners for the ram head. The improved arrangement, which is shown in Fig. 4, and also in Fig. 9 consists in providing a plurality of units 51 composed of bricks or slabs of fire clay, glass-slag, cast iron or any other suitable insulating or non-conducting or fireproof material, and these are fitted together in such a manner as to form a lining, and they are clamped or held in position between retaining rails 52 located longitudinally of the tube. There is a plurality of these rails, each rail extending longitudinally the entire length or substantially the entire length of the tube, and each longitudinal rail is spaced apart from its adjacent ones, so as to leave spaces between for the reception of the units or slabs 51. These rails are flanged at the base, which flanges are attached to the tube by countersunk headed bolts (not shown) so as to be secured in position, the tube casing being provided with slotted holes to allow for expansion. The heads of the rails have bulbs or flanges which overlap the units or slabs so as to form a positive interlocking of the bulb, or flanged heads with the sides of the units or slabs for their entire length.

Figures 8, 9:
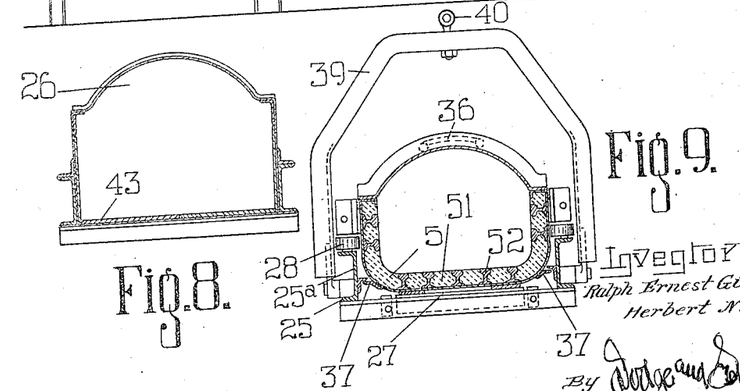
Figures 8 and 9 are cross sections on the lines A—B and C—D respectively of Fig. 7.

In constructing the lining for the tube, we slide a number of units or slabs 51 of fire proof material longitudinally one after another into the spaces between the rails 52 the first one in each row being pushed well home against abutments at the end of the tube, and the other units being pushed well home against the unit in front so as to form butt joints, and then a closing device is applied to prevent the units coming out.

Thus a lining is formed of fire proof units which lie flush one with another alternating with metallic bulb or flanged heads of the rails, which heads project a little beyond the plane of the insulating units, so as to form runners for the ram head inside the tube and along which the coke slides when pushed through the tube. Consequently a non-conducting or insulating lining can be built up very rapidly, and which will further provide facilities for repairs to be undertaken to any particular area of the insulation which may become disturbed. The head portions of the rails may be provided with cross cuts at intervals, to allow for expansion and contraction, which will be greater at the heads which come into contact with the hot coke, than at the base and thus prevent buckling.

This arrangement of lining may be arranged all round the interior of the tube, or as shown in Fig. 4, it may be arranged at that part of the interior of the tube upon which the coke directly rests, in which case that part of the tube against which the coke does not come into touching contact, may be arranged with units or slabs bolted to a metal casing, or a series of metal covers only, consisting of plates 53 suitably curved and stiffened, may be adopted. Or the tube may be made of a trough shaped channel having an insulating lining as described, the other section of the tube being formed of insulating units bolted to arched metal straps or bands clamped in position. The units may be arranged to provide for air spaces for the passage of a current of air for cooling purposes.

Figures 10, 12, 13, 16:
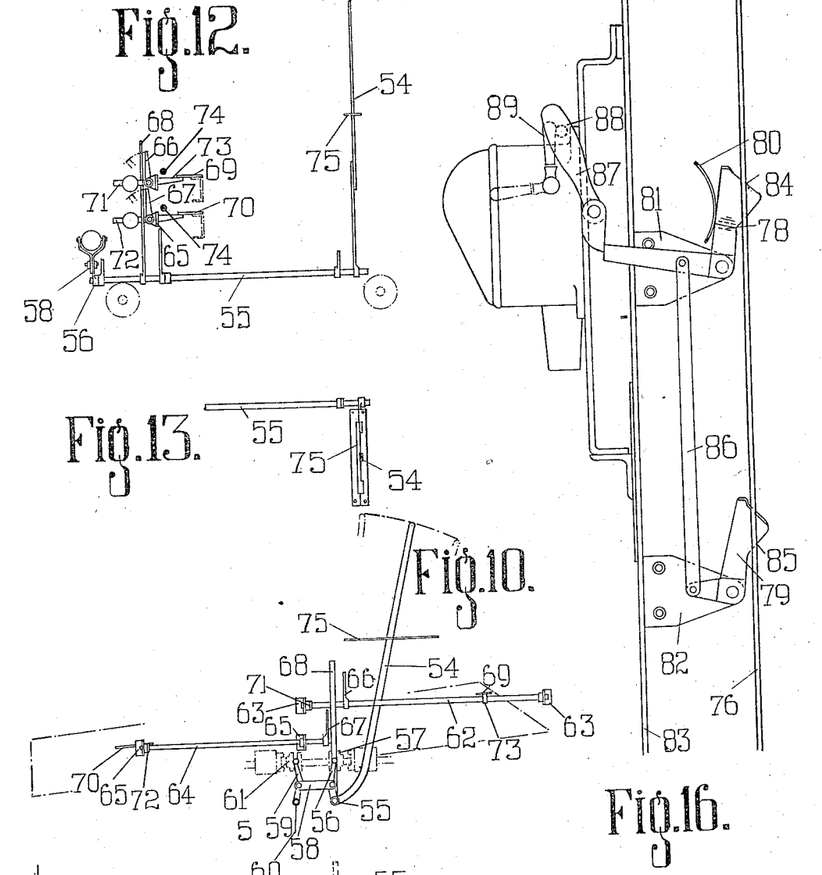
Figures 10–13 are various views of an arrangement of interlocking safety lever mechanism for the front and rear lifting clutch gear.
Figures 14–16 illustrate an arrangement of trip-gear for preventing overlifting of the front and rear ends of the coke-tube, Figure 14 being a side elevation, Figure 15 a plan and Figure 16 a front elevation.
Figure 11:
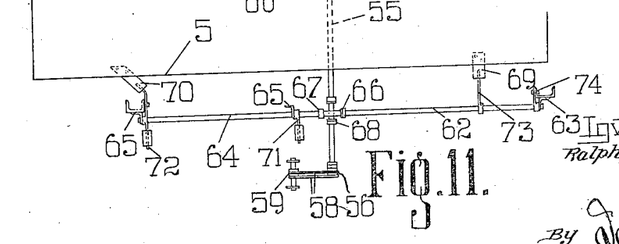

In Figs. 10 to 13 details are illustrated of a safety arrangement for use in conjunction with the front and rear lifting clutch gear, for the purpose of rendering it impossible to lift the front end of the coke tube unless the rear end of the tube rests in its bottom position. When the tube 5 is in the position shown in Fig. 1 for discharging into the internal producer 2, it will be seen that if the front hoisting gear were inadvertently operated, the front end of the tube would foul the mouth pieces of the retorts and do damage. In the arrangement shown in the drawing a pair of safety masking levers are provided, which in certain circumstances project into the path of the hand-lever that controls the front and rear lifting clutch gear, and prevents its operation. 54 is the clutch-controlling hand-lever connected with the rock-shaft 55. 56 is a lever operating the rear clutch 57 and connected by links 58 to lever 59 fulcrumed at 60 for operating the front lifting clutch 61. 62 is a rock-shaft mounted in angle-iron brackets 63, and 64 a second rock-shaft mounted in angle-iron brackets 65, 66 and 67 are the safety masking-levers, respectively fulcrumed on the shafts 62 and 64. On the rock-shaft 55 is also fulcrumed a long lever 68, 69 and 70 are projecting plates, attached respectively to the rear and front ends of the coke-tube 5. 71 is a weighted lever on the shaft 62 and 72 a weighted lever on the shaft 64. When the coke-tube is resting in its bottom position on the trunnions 8 and 8$^a$, the plate 70 on the front end of the tube bears on one end of the lever 72, and the plate 69 on lever 73. This causes the safety masking-levers 66 and 67 to assume a vertical position, as in Fig. 12, thus rendering it possible for the long lever 68 to move in either direction when the hand-lever 54 is operated, and enables either the rear or front lifting clutch to be put in. Assuming it is chosen to lift the rear end of the coke-tube, after putting in the rear lifting clutch 57, the motor is operated, and the rear end of the tube 5 commences to rise. This withdraws the plate 69 clear of the lever 73, whereupon the action of the weight on lever 71 causes the safety lever 66 to come over to the position shown in dotted lines in Fig. 12, and lie in the path of lever 68, which renders it impossible for the clutch to be changed without returning the tube again to its bottom position. Stops 74 are provided to limit the movement of the levers 66 and 67. The hand lever 54 works in a slotted quadrant sector or like plate 75, with notches for the three positions of the lever. In Fig. 13 the lever 54 is shown in its neutral position.

Figures 14, 17:
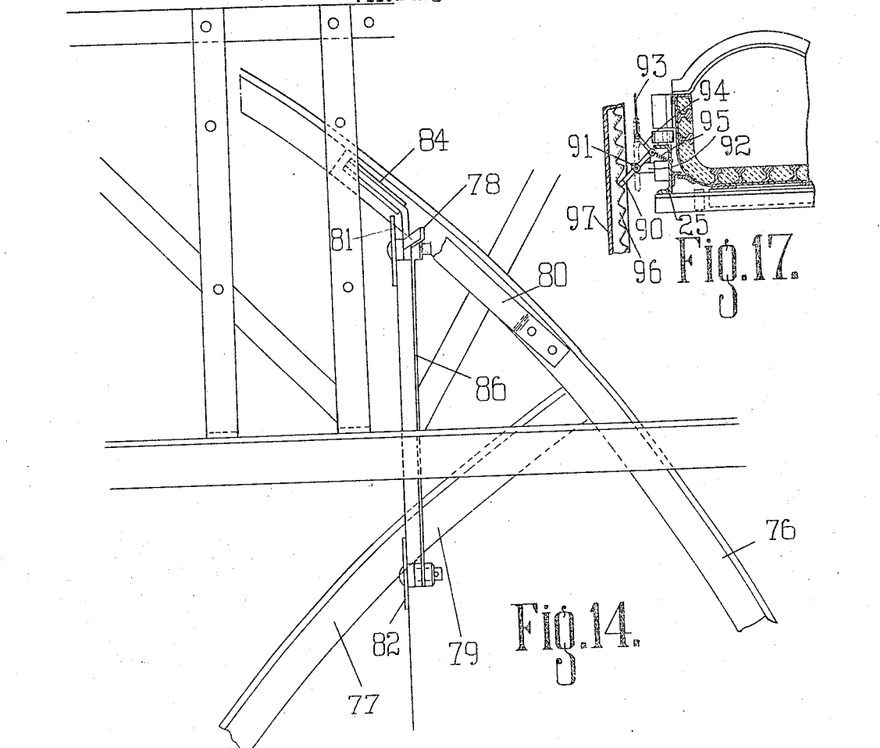
Figure 17 illustrates a safety device for arresting the fall of the cradle in case of breakage of the hoisting-rope.
Figure 15:
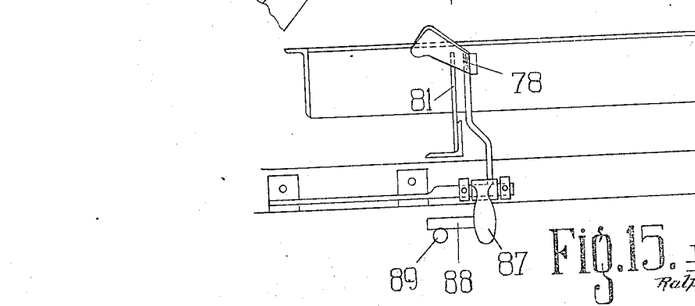

Figures 14 to 16 show an arrangement of trip-gear controlling an electric switch to prevent overlifting of the coke-tube. In this arrangement the coke-tube 5 moves between a pair of curved angle-iron guides. 76 is one of the angle guides for the front of the tube, and 77 one of the guides for the rear of the tube. 78 and 79 are bell-crank levers fulcrumed on brackets 81 and 82 bolted to an upright 83. The noses on the upper parts of these levers 78 and 79 project under the pressure of springs 80, through slots 84 and 85 cut in the front and rear curved angle-guides, so as to lie in the path of the tube when its ends are being hoisted too high. 86 is a link connecting the two bell-crank levers 78 and 79. 87 is a trip-lever weighted at its upper end and having a projecting pin 88 which bears against the handle 89 of an electric switch.

In the normal position shown in Fig. 16, the tail end of the lever 78 holds up the weighted trip-lever 87 in the inoperative position. When however, the front or rear end of the coke-tube has been hoisted to its upper limit, the tube will press back the lever 78 or 79, and so release the trip-lever 87, which thereupon overbalances and its pin 88 turns the switch handle 89 into the "off" position shown in dotted lines in Fig. 16

In order to enable the curved tubular bridge-pieces referred to in our Patent No. 1,424,010, to be dispensed with, we mount the coke-tube 5 so as to be longitudinally movable in a cradle, the back end of the tube being adapted to telescope into the hooded rear end of the said cradle. The tube and its cradle are, of course, hoisted together. In this arrangement when the front end of the tube is to be hoisted to connect with the middle or upper tiers of retorts, the tube is longitudinally adjusted on its cradle to the required extent, by hand or by any suitable mechanical means, to enable the gap between the mouthpiece of the retort and the end of the tube which would result from the radial movement of the tube to be bridged. Stops or locking means are provided to hold the tube in its various adjusted positions in the cradle. These features will now be more fully described.

Figure 3:
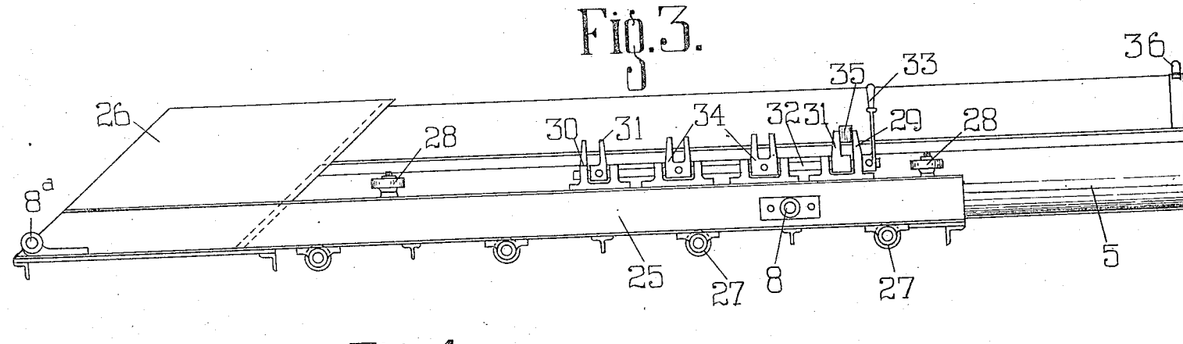
Figure 3 is a side elevation, and Figure 4 a front elevation of the coke-tube mounted so as to be telescopically adjustable in a cradle, with stop mechanism for locking the tube in various positions in its cradle.
Figure 5:
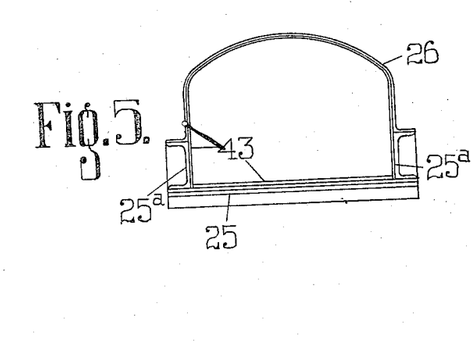
Figure 5 is a front elevation of the hooded rear end of the said cradle.

Referring first to Figs. 3, 4, and 5, the coke-tube is mounted so as to be slidable in the cradle 25, which consists mainly of two members 25$^a$, of channel or other section, suitably stayed to each other by ribs above and below. This cradle has an open-ended hood 26 at its rear end into which the back end of the coke-tube telescopes. The bottom of the cradle 25 carries transverse anti-friction rollers 27 upon which the bottom of the tube 5 rolls. Lateral guide rollers 28 on pins attached to the cradle bear against the sides of the coke-tube 5. The cradle 25, with the coke-tube is arranged to be lifted radially from either end pivoting on fulcrum 8 or 8$^a$, so that producers may be charged or coke deposited on the quenching bench as heretofore.

A locking mechanism to lock the tube in its various adjusted positions is illustrated in Figs. 3 and 4. 29 and 30 are fixed end-stops. 31 are locking arms mounted on a rock-shaft 32 operated by the hand-lever 33, and 34 are forked locking arms which form stop devices for the intermediate positions. 35 is a lug or projection on the side of the tube 5 that is engaged by the stops. 36 is a handle for use in longitudinally moving the tube 5. This locking mechanism is shown in Figs. 3 and 4 applied to one side only of the cradle and tube, but it may if required be fitted to both sides.

37 are angle plates on the tube and cradle to prevent the tube being lifted out of the cradle.

The construction of coke-tube and cradle shown in Figs. 6–9 embodies some modifications, especially in the stop mechanism, which will now be described. The cross rollers 27 are made shorter in this case, and are journalled at their ends in bearing 38. 39 is a lifting bridle fitted at top with a forked bolt 40 and pin 41 on which the hoisting rope is attached for raising the front end of the tube. The back end of the cradle is also fitted with a similar bridle.

42 are poking-holes with covers in the side of the coke-tube. 43 are removable cast iron lining plates in the hood 26.

Figures 6, 7:
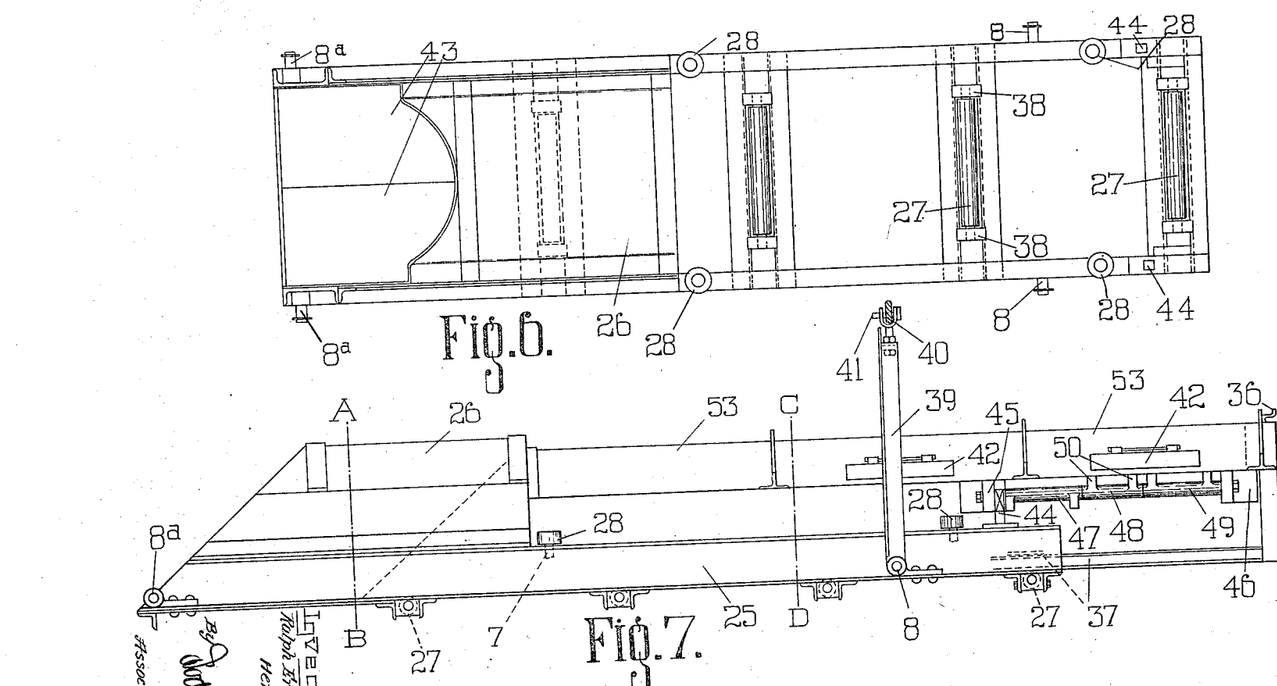
Figure 6 is a plan view of a modified form of the cradle.
Figure 7 is a side elevation of the coke-tube and cradle, showing also an alternative arrangement of stop mechanism.

An alternative form of stop mechanism is shown in Fig. 7. 44 are stops fitted on the front end of the cradle. 45 are angle-brackets bolted on the side of the tube forming a limit stop for movement of the tube in the outward direction to connect with the top retorts, and 46 are brackets forming a limit stop for movement of the tube in the other direction. On each spindle carried in these brackets are mounted three tubular swivelling stops 47, 48 and 49, each having a pair of projections or lugs 50. These three stops can be turned through 180° or more so as to bring the projections 50 as required, into or out of engagement with the fixed stops 44. In Fig. 7 the tube 5 is extended to its maximum, and locked in position for receiving coke from the top retorts. To telescope the tube for the second upper-most tier of retorts, the swivelling stop 47 is turned by hand clear of the stop 44 and the stop 48 turned down. The tube is then telescoped into the cradle until arrested by a lug on the stop 48 coming into contact with the fixed stop 44. Stop 47 is then turned down again, and the tube thus completely locked. Similarly, the stops 48 and 49 lock the tube for the middle retorts, while the limit stop 46 and stop 49 lock the tube for the bottom retorts, "second bottoms", and the producers.

We may provide any suitable device for arresting the fall of the cradle, in the case of breakage of the hoisting ropes. Such a device may take the form illustrated in Fig. 17 in which spring-controlled catch-levers 90 are fulcrumed at 91 on brackets 92 on the side-members at each side of the cradle 25. The hoisting-rope 93 is connected to an arm 94 pivoted to the catch-lever 90. 95 is a spring connected at one end to the catch-lever, this spring being tensioned when the catch-lever is in its normal position (shown in chain lines). If the hoisting-rope should break, the catch-levers, under the influence of the springs 95, will tilt and their lower ends will engage the teeth or projections 96 in the curved side-guides 97, as shown in full lines in Fig. 17. The cradle would thus be stopped in its fall, and any possibility of the front of the coke-tube damaging the retort mouthpieces is avoided.

Figure 18:
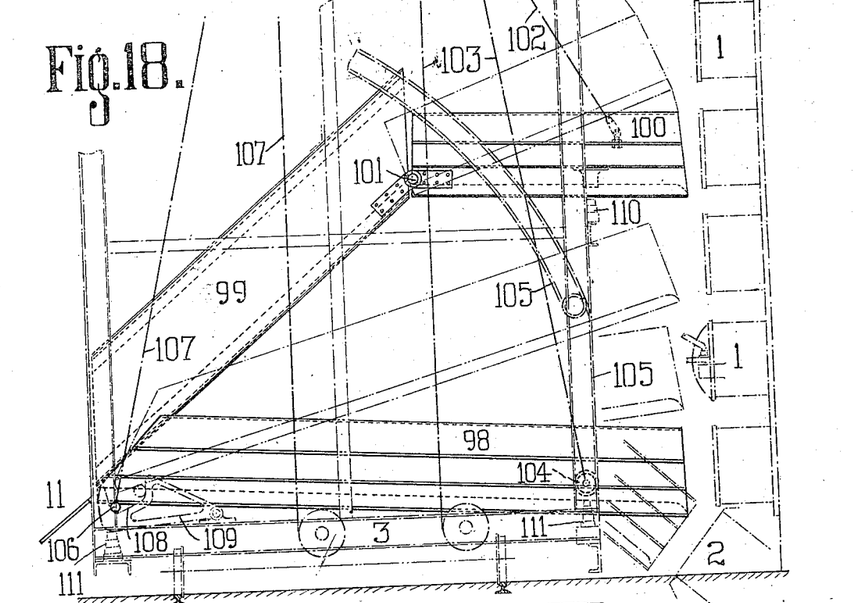
Figure 18 is a side elevation of a construction in which two coke-tubes are mounted in parallel on the carriage.
Figure 19:
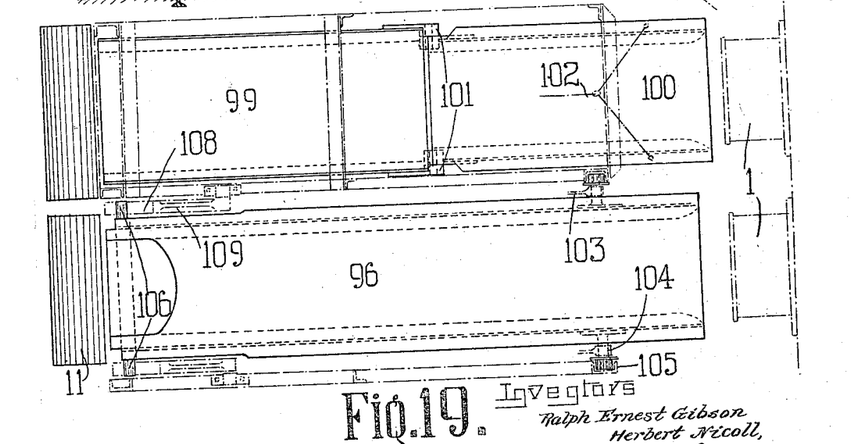
Figure 19 a plan of the same, with the top of the superstructure, the upper part of the hoisting-gear, and the rail-wheels omitted.

In the construction of our apparatus illustrated in Figs. 18 and 19 we use two coke-tubes mounted in parallel on the travelling-carriage 3. The tube 98 in its various positions indicated receives coke discharged from the three lower tubes of retorts 1. The other coke-tube is made in two portions, namely a fixed rear portion 99, set in an inclined position, and a front radially-moving portion 100 hinged at 101 to the front of the fixed tube portion 99. The movable hinged tube 100 is adapted to receive coke from the two uppermost tiers of retorts, and pass it into the fixed inclined tube 99, the hinged tube 100 being hoisted by the rope 102 into the position shown in chain lines, to receive coke from the top tier of retorts. 103 are the hoisting-ropes for the front end of the tube 98, these ropes being connected to the front trunnions 104, which are guided in channel guides 105. 106 are rear trunnions of the tube 98, to which rear trunnions the hoisting-ropes 107 for the back end of the tube are connected. The rear trunnions 106, when the front end of the tube is raised by the ropes 103, into the positions indicated by chain lines, move up an inclined surface 108 on a bracket 109 bolted to the framework of the travelling-carriage. By the forward movement of the tube when its front end is hoisted, the front of the tube is approached towards the mouthpieces of the retorts to compensate for the radial movement of the tube. 110 and 111 are buffer springs for the hinged tube 100 and the tube 98 respectively.

To feed the internal producers 2, the back end of the tube is raised by the hoisting-ropes 107, and the tube tilted on the front trunnions 104 into the position shown in broken lines.

We declare that what we claim is:—

1. An apparatus for handling incandescent coke discharged from carbonizing-chambers arranged in superposed tiers, comprising a tube adapted to receive the coke on its discharge and mounted on a carriage travelling along in front of the carbonizing chambers; hoisting means whereby either of the ends of the tube may be raised or lowered to discharge the coke by gravity from either end of the tube and means for mechanically applying pressure to the back of the charge of coke in the tube to supplement the gravity-discharge from the front end of the tube when feeding the producers under a bench of carbonizing chambers.

2. An apparatus for handling incandescent coke discharged from carbonizing-chambers arranged in superposed tiers, comprising a tube adapted to receive the coke on its discharge and mounted on a carriage travelling along in front of the carbonizing chambers; hoisting means whereby either of the ends of the tube may be raised or lowered to discharge the coke by gravity from either end of the tube; and mechanical means comprising a block chain sprocket gear for operating said chain, and a pusher fixed to one of said block chains, for applying pressure to the back of the charge of coke in the tube to supplement the gravity-discharge from the front end of the tube when feeding the producers under a bench of carbonizing chambers.

3. An apparatus for handling incandescent coke discharged from carbonizing-chambers arranged in superposed tiers, comprising a tube adapted to receive the coke on its discharge and mounted on a carriage travelling along in front of the carbonizing chambers; hoisting means whereby either of the ends of the tube may be raised or lowered to discharge the coke by gravity from either end of the tube; mechanical means comprising a block chain, sprocket gear for operating said chain, and a pusher fixed to one end of said block chain, for applying pressure to the back of the charge of coke in the tube to supplement the gravity-discharge from the front end of the tube when feeding the producers under a bench of carbonizing-chambers; and means for preventing the operation of the pusher unless the coke-tube is in the correct position in relation thereto, and for preventing the lowering of the rear end of the coke-tube before the withdrawal of the pusher therefrom.

4. An apparatus for handling incandescent coke discharged from carbonizing chambers arranged in superposed tiers, comprising a tube adapted to receive the coke on its discharge and mounted on a carriage travelling along in front of the carbonizing chambers; hoisting means whereby either of the ends of the tube may be raised or lowered to discharge the coke by gravity from either end of the tube; means for mechanically applying pressure to the back of the charge of coke in the coke-tube when feeding the producers under a bench of carbonizing-chambers, comprising a block chain, sprocket-gear for operating said chain and a pusher-plate connected to one end of said block-chain; means for preventing the operation of the pusher unless the coke-tube is in the correct position in relation thereto; and means for preventing the lowering of the rear end of the coke-tube before the withdrawal of the pusher therefrom.

5. An apparatus for handling incandescent coke discharged from carbonizing-chambers arranged in superposed tiers, comprising a tube adapted to receive the coke on its discharge and mounted on a carriage travelling along in front of the carbonizing chambers; hoisting means whereby either of the ends of the tube may be raised or lowered to discharge the coke by gravity from either end of the tube; trunnions on the front and back ends of the coke-tube on which said tube can pivot when hoisted at either end and means whereby the said coke-tube is capable of moving towards or away from the front of the carbonizing chambers, to enable its front end to be approached close to the mouthpieces of the upper tiers of carbonizing chambers and compensate for the radial movement of the tube when its front end is hoisted.

6. An apparatus for handling incandescent coke discharged from carbonizing-chambers arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction and into which it can telescope; hoisting means whereby the cradle and coke-tube together may be raised or lowered at either end to discharge the coke by gravity from either end of said tube, and trunnions on the front and back ends of the cradle on which the said tube can pivot when hoisted at either end.

7. An apparatus for handling incandescent coke discharged from carbonizing-chambers, arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction; hoisting means whereby the cradle and coke-tube together may be raised or lowered at either end; and a hooded portion at rear end of the cradle into which the back end of the coke-tube can telescope.

8. An apparatus for handling incandescent coke discharged from carbonizing-chambers, arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction; trunnions on each side of the cradle towards the ends thereof which rest in bearings on the travelling-carriage when the cradle and coke-tube are in their bottom positions; and hoisting means comprising ropes connected to said trunnions whereby the cradle and coke-tube may be raised or lowered at either end.

9. An apparatus for handling incandescent coke discharged from carbonizing-chambers arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction and hoisting means whereby the cradle and coke-tube together may be raised or lowered at either end, anti-friction rollers on the cradle for the bottom of the coke-tube to run on; and lateral guide-rollers on the cradle bearing against the sides of the coke-tube.

10. An apparatus for handling incandescent coke discharged from carbonizing-chambers arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction, hoisting means whereby the cradle and coke-tube together may be raised or lowered at either end; and means for locking the said tube in various positions in the cradle, comprising limit-stops on the front end of the cradle and tube respectively, and a plurality of swivelling stop-members having lugs for locking the said tube in various intermediate positions in the cradle.

11. An apparatus for handling incandescent coke discharged from carbonizing-chambers arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction; hoisting means whereby the cradle and coke-tube together may be raised or lowered at either end; means for locking the said tube in any of its various adjusted positions in the cradle; and trunnions on each side of the cradle towards the ends thereof which rest in bearings on the travelling carriage when the cradle and coke-tube are in their bottom position.

12. An apparatus for handling incandescent coke discharged from carbonizing-chambers arranged in superposed tiers comprising a tube adapted to receive the coke on its discharge and mounted on a carriage adapted to travel along in front of the carbonizing-chambers; a cradle mounted on said travelling-carriage in which the coke-tube is longitudinally movable in either direction; hoisting means whereby the cradle and coke-tube together may be raised or lowered at either end; means for locking the said tube in any of its various adjusted positions in the cradle; trunnions on each side of the cradle towards the ends thereof which rest in bearings on the travelling carriage when the cradle and coke-tube are in their bottom position; hoisting means whereby the cradle and coke-tube may be raised or lowered at either end; and guiding-means on the framework of the travelling-carriage to guide the cradle and coke-tube when being raised or lowered by the hoisting means.

13. An apparatus for handling incandescent coke discharged from carbonizing-chambers arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction; hoisting means whereby the cradle and coke-tube together may be raised or lowered at either end; and means for preventing the operation of the front-hoisting gear unless the rear end of the cradle is in its bottom position.

14. An apparatus for handling incandescent coke discharged from carbonizing-chambers arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction; hoisting means whereby the cradle and coke-tube together may be raised or lowered at either end; and means for controlling the clutches for the front and rear hoisting gear, said means including a pair of masking levers arranged and operating substantially as described.

15. An apparatus for handling incandescent coke discharged from carbonizing-chambers arranged in superposed tiers, comprising a tube adapted to receive the coke on its discharge and mounted on a carriage adapted to travel along in front of the carbonizing-chambers; a cradle mounted on said travelling-carriage in which the coke-tube is longitudinally movable in either direction; electric hoisting means whereby the cradle and coke-tube may be raised or lowered at either end; guiding means on the framework of the travelling-carriage to guide the said cradle and tube when being raised or lowered; means for preventing the operation of the front hoisting gear unless the rear end of the cradle is in its bottom position; and means for preventing the over-lifting of the front and rear ends of the coke-tube comprising trip-devices adapted to operate a switch to stop the electric hoisting-gear when the prescribed limit of movement is reached.

16. An apparatus for handling incandescent coke from carbonizing-chambers arranged in superposed tiers, comprising a tube adapted to receive the coke on its discharge and mounted on a carriage travelling along in front of the carbonizing-chambers; hoisting means whereby either of the ends of the tube may be raised or lowered to discharge the coke by gravity from either end of the tube; and mechanical means comprising a pusher fixed to one end of a block chain and operated by sprocket gear, for applying pressure to the back of the charge of the coke in the tube to supplement the gravity-discharge from the front end of the tube when feeding the producers under a bench of carbonizing chambers; and a lining in that part of the coke tube that comes in contact with the hot coke consisting of rows of heat-insulating units inserted between and held by a plurality of spaced rails extending longitudinally in the tube, the flanged heads of the rails slightly projecting beyond the upper surface of the insulating units and forming runners for the pusher and the coke.

17. An apparatus for handling incandescent-coke discharged from carbonizing-chambers arranged in superposed tiers, comprising in combination a tube adapted to receive the coke on its discharge and mounted on a carriage adapted to travel along in front of the carbonizing-chambers, a cradle in which the coke-tube is mounted so as to be longitudinally movable therein in either direction; means for locking the coke-tube in any of its adjusted positions in the cradle; hoisting means for raising or lowering the cradle and coke-tube together at either end; means for preventing the front end of the cradle and coke-tube being hoisted unless the rear end of the cradle is in its bottom position; means for stopping the operation of the hoisting-gear when the cradle and coke-tube have been hoisted up to a certain height; means comprising a mechanically-operated pusher for applying pressure to the back of coke in the coke-tube to supplement the gravity-discharge from the front end of the tube when feeding producers under the bench of carbonizing-chambers; means for preventing the operation of the pusher unless the coke-tube is in correct position in relation thereto; means for preventing the lowering of the rear end of the coke-tube before the withdrawal of the pusher therefrom.

18. An apparatus for handling incandescent coke discharged from carbonizing-chambers arranged in superposed tiers, comprising a tube mounted on a travelling-carriage and adapted to receive coke discharged from the lower tiers of the carbonizing-chambers; hoisting means for raising or lowering either end of the said tube, so that coke may be discharged from either end thereof; a second coke-tube mounted on the travelling-carriage parallel to the first coke-tube and consisting of a fixed rear portion set in an inclined position and a radially-movable front portion hinged to the front end of the inclined fixed rear tube and adapted to receive coke from the upper tiers of carbonizing chambers and pass it into the said fixed inclined rear tube portion; and hoisting-means for raising or lowering the hinged tube to connect with the uppermost tiers of the carbonizing-chambers.

In witness whereof, we have hereunto signed our names this 18th day of July, 1923, in the presence of two subscribing witnesses.

RALPH E. GIBSON.
HERBERT NICOLL.

Witnesses:
G. C. DYMOND,
J. McLACHLEN.